Jan. 17, 1933.  J. BIJUR  1,894,659
LUBRICATION
Original Filed Aug. 22, 1925
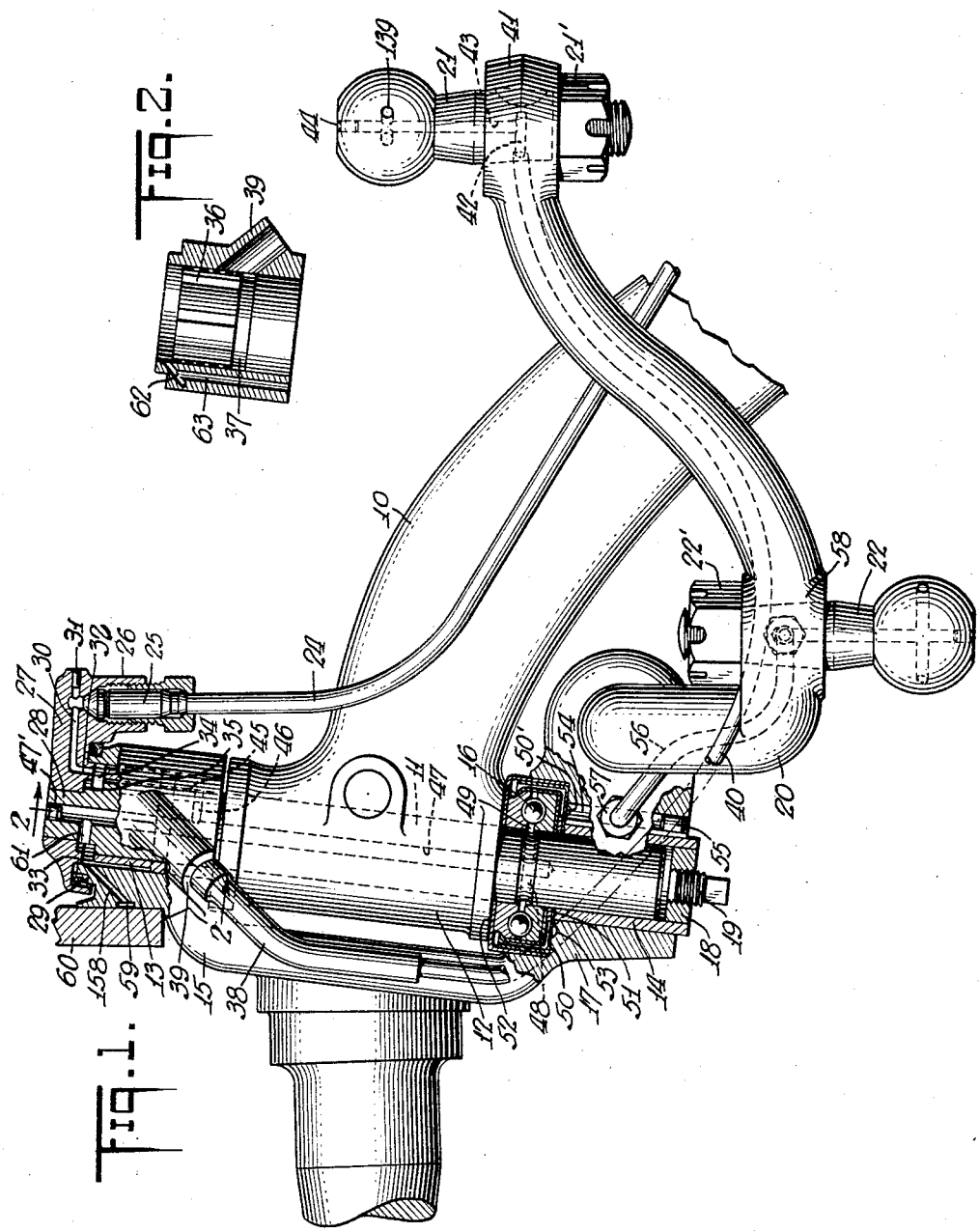
INVENTOR
Joseph Bijur
BY
ATTORNEYS

Patented Jan. 17, 1933

1,894,659

UNITED STATES PATENT OFFICE

JOSEPH BIJUR, OF NEW YORK, N. Y., ASSIGNOR TO AUTO RESEARCH CORPORATION, A CORPORATION OF DELAWARE

LUBRICATION

Original application filed August 22, 1925, Serial No. 51,733. Divided and this application filed September 29, 1930. Serial No. 485,056.

My present invention is concerned with gravity flow systems and has a preferred application in association with pressure lubricating systems, more particularly for delivering lubricant by gravity flow from a pressure line to the bearing or bearings of a structure having a swivel or other relationship to the main lubricated structure and especially where it is undesirable to convey the lubricant under pressure past or across such swivel or other connection.

The invention is shown embodied in the steering knuckle of a motor vehicle and provides convenient means for reliably supplying with clean oil, all or any number of the bearings carried by or associated with said knuckle and without the need for selective manipulation by direct manual access to the individual bearings and without the use of any protruding or projecting conduits likely to be torn loose in ordinary use of the vehicle.

Where a downwardly extending pipe line delivers by gravity flow, for instance, to the tie rod bearings of a steering knuckle, irregularity of operation might be encountered by the lubricant admitted thereto being arrested in the pipe until after several lubricating operations, a column of sufficient weight had accumulated therein, to flow out, so that the bearing would intermittently receive an oversupply of oil stored in the pipe in several intervening operations.

Where two or more bearings at different levels, for instance, the drag link and the tie rod bearings are supplied by gravity flow from a common source, there is in addition the likelihood that a siphoning action may ensue which would cause flooding of the lower bearing, drawing lubricant from the line leading to the higher, the latter, accordingly, receiving too little oil.

According to the present invention, such defective operations, both the flow arresting and the siphoning actions noted, are obviated by venting preferably the upper part of any draining conduit devoid of a lubricant trap, so that even though said conduit system be of diameter as little as ⅛" or even 1/16" bore, lubricant admitted thereto would flow out to the bearing at the lower end thereof, substantially without time lag, this because atmospheric pressure is maintained both at the upper and lower end of such conduit.

Since a vent indiscriminately located or formed in a knuckle would be subject to clogging by dust or mud splashed onto the knuckle in use of the vehicle, it is an object of the invention to arrange the vent to substantially preclude such clogging, without, however, forming it so large that foreign particles could without clogging the vent pass therethrough to the conduits.

For this purpose, the vent is disposed in a particularly protected position and is, moreover, arranged to inherently shed any mud or dirt that might reach it.

In one application, the upper of the swivel bearings for the knuckle permits the free passage of lubricant to the top of the king pin from the corresponding inlet fitting carried by a contiguous part on the axle and conduits carried by the knuckle and in flow intercepting relationship with respect to lubricant that has traversed the swivel lead to the knuckle bearings. Venting is effected through a bore leading to atmosphere from the region of the upper end of the king pin, said bore extending in a downward direction through the structure and substantially protected by the brake shield or some other part of the knuckle or axle, or carried by the knuckle or the axle.

In the accompanying drawing in which is shown one embodiment of the invention,

Fig. 1 is a side elevation partly in section of one embodiment of the invention, and Fig. 2 is a fragmentary detail sectional view taken on line 2—2 of Fig. 1 showing a modification.

Referring now to Figs. 1 and 2 of the drawing, I have shown a knuckle assembly comprising an axle beam 10 having a king pin 11 extending through an eye 12 thereof, protruding therebeyond and affording bearings for bushings 13 and 14 press-fitted into the jaws of a knuckle clevis 15. The lower bushing 14 has a plug 18 press-fitted into its lower end to prevent escape of lubricant, a screw plug 19 closing an aperture therein through which a pin may be driven for removing the king pin in disassembly. A ball thrust bearing 16 rests on the lower knuckle clevis jaw 17 and sustains the axle beam thereupon The knuckle has rigidly secured thereto an arm 20 which in this instance is curved and which has at the outer end thereof an upwardly extending ball stud 21 taper-fitted thereinto, as shown, by pressure applied by a nut 21' threaded on the end of the stud and pressing against the arm. Intermediate the ends of the arm 20 is a ball stud 22 for the tie rod, said stud extending downward therefrom, and also taper-fitted by pressure applied by nut 22'.

According to the present embodiment, there are lubricated from a single source both the upper and lower bearings of the king pin in their respective bushings, the ball thrust bearing 16 upon which the axle beam rests, the drag link bearing and the tie rod bearing. To this end, the lubricant is delivered to the knuckle through a pressure-tight pipe 24 which may be of seamless metal having an outlet terminal 25 which may be a drip plug, for instance, of the type disclosed in the co-pending application of Edward H. Kocher, Serial No. 22,104, filed April 10th, 1925. The drip plug 25 is fitted into a downwardly extending socket 26 in a cap structure 27 rigid with the axle. The king pin is provided with a reduced upper extension 28, protruding into a tightly fitting central aperture in cap 27 which is preferably also pinned to the king pin. The cap is generally annular in construction except for the lug attachment of the drip plug and encircles the upper end of the knuckle. An annular washer 29 is interposed between the knuckle and the cap to preclude the entry of dust to the swiveling or bearing surface. The lubricant from the drip plug passes through a bore 30 in the cap plugged at its outer end at 31 and drips downwardly through a bore 32 in an annular pilot flange 33 on the cap fitting into the upper knuckle clevis. The lubricant collects in the annular well 34, the bottom of which is formed by the upper end of the bushing 13 and the shoulder 35 at the base of the reduced king pin extension 28. The upper bushing is provided with a passageway, preferably formed by a plurality of longitudinal external grooves 36, which communicate with a peripheral groove 37 intermediate the ends of said bushing. The groove 37, in turn, communicates with a pipe 38 fitting at its upper end in a corresponding apertured boss 39 formed integral with the upper knuckle bearing extending downwardly from substantially the level of groove 37 along the structure of the knuckle to the drag link bearing.

The pipe 38 is shown of relatively large diameter, one-quarter inch bore, or more, so that the lubricant can trickle downwardly past any air therein, said larger diameter part extending down at least to the level of the outlet 139 to the drag link bearing. The rest of the pipe 40 which may extend, as shown, along the drag link below outlet 139, may be of smaller diameter, too small to permit passing of lubricant around any air therein, in manner and for reasons fully set forth in my patents above identified. Preferably, the outlet end of the line 40 extends radially inward at the eye 41 at which the ball stud 21 is mounted, and delivers by way of a radial bore 42 in the stud into an axial bore 43 plugged at 44 at its upper end and communicating through one or more of the radial outlet bores 169 through the ball for oiling the corresponding drag link bearing.

The king pin has a flat 45 near its upper end determining a narrow passage communicating with the well 34 and a radial bore 46 leading from the flat 45 to an axial bore 47 which axial bore extends downwardly to substantially the level of the ball thrust bearing 16 and is plugged at the upper end at 47'. The king pin has a radial bore 48 establishing communication between the axial bore 47 and a peripheral groove 49 about the king pin, substantially at the level of the ball thrust bearing from which the latter is lubricated.

The thrust bearing is constructed so that lubricant may drain therefrom to supply the tie rod bearing. The assembled bearing is enclosed in a sheet metal capsule composed of two telescoped caps, the lower of which 50 rests in the knuckle and carries a star washer 51 upon which the thrust bearing assembly rests, the axle beam resting on the upper cap 52. Such lubricant as overflows around the ball bearing passes between the teeth of the star washer through one or more apertures 50' in the cap 50, into an annular groove 53 formed in the upper surface of the lower knuckle clevis jaw, which drains into a vertical bore 54 through the lower jaw of the clevis, said bore being plugged at 55 at its lower end. Bore 54 delivers between its ends into a pipe 56 secured by an appropriate terminal 57 to the knuckle, said pipe extending downward to eye 58 in the arm 20 which carries the tie rod ball stud 22. The latter is bored in the same manner as the drag link stud to supply lubricant to the tie rod bearing.

In the present embodiment, the bore 47 of the king pin and the pipe 56 leading to the tie rod both are made of diameter too small to permit passing of lubricant about any air therein, and if desired, as small as $\frac{1}{16}''$ bore. To facilitate free flow of the lubricant through the small conduit and to preclude stoppage of a plurality of charges therein followed by flooding of the bearing, the upper end of the knuckle is vented. In one embodiment, this vent consists of a bore 158 extending obliquely downward through the upper knuckle from the side wall of the well 34 and communicating with a shallow downwardly sloping groove 59 at the wheel side of the knuckle at which the brake shield 60 or equivalent structure is secured. I have thus disposed a vent where dust and dirt will not readily get at it, and even if they should, would drop therefrom by gravity. The king pin bore 47 and the communicating tie rod conduit 56 are effectively vented through a radial bore 61 which connects said king pin bore with the vented well 34.

In operation, lubricant admitted to the knuckle from a remote source of pressure will be forced through the drip plug 25 and will flow through the passage 30–32 into the well 34 where it divides. One part of the lubricant will pass along longitudinal grooves 36 to the peripheral groove 37 whence it escapes through the boss 39 and pipe 38 to the drag link bearing 21 by way of pipe 40 and bores 42, 43 and 169. Normally lubricant will be trapped in the pipe 40 below the level of the drag link outlet bores 39 and it will be understood that such lubricant as passes down the large pipe 38 on to the trapped lubricant, will cause the delivery of a corresponding charge at the bearing.

Another part of the lubricant from the well 34 will flow down the flat 45 through the bore 46 into the longitudinal bore 47 of the king pin. Said bore being vented through the radial bore 61, well 34 and venting aperture 158, the lubricant will readily pass down therethrough and through radial bore 48 into the ball thrust bearing 16. A small part of the lubricant will pass downward from the groove 49 along the lower king pin bearing 14 to lubricate the latter, the lubricant collecting between the plug 18 and the bottom of the king pin. Oil escaping from the ball thrust bearing passes between teeth of the star washer 51 through the ports 50′ to the grooves 53, which drains through the bore 54 into the pipe 56 and thence into the bore of the tie rod pivot stud 22. The vent 58 maintains atmospheric pressure at the top of the king pin bore 47 and at the various pipes supplied therefrom, so that siphoning of lubricant from the king pin bearing or the drag link bearing to the tie rod bearing or from the upper king pin bearing to the drag link or from the latter to the lower king pin bearing is substantially precluded.

In Fig. 2 is shown a modification of the embodiment shown in Fig. 1 in which the venting bore in the upper knuckle clevis extends preferably obliquely at 62 but partly through the thickness of the upper knuckle and thence communicates with a longitudinal bore 63 terminating at the lower face of said clevis jaw. Inasmuch as the thrust bearing 16 is at the lower end of the axle eye, a small space will be maintained between the upper face of the axle eye 12 and the upper clevis jaw, so that the bore 63 is effectively vented thereat.

While I have shown the invention applied to a reverse Elliott type axle, that is, to one in which the clevis on the knuckle straddles the axle, it will be understood that the general principles thereof may be readily applied to an Elliott axle, in which the clevis is on the axle and straddles the knuckle eye.

The invention is not limited in its application to remote control lubrication or to the use of a drip plug for admitting lubricant to the knuckle. An oil cup or other lubricant admitting fitting may be applied to the knuckle instead of the drip plug, for supplying the various knuckle bearings in the manner disclosed and claimed.

This application is a division of application Serial No. 51,733, filed August 22, 1925.

It is to be understood that there may be many changes and modifications made in the construction and the arrangement of the details of my invention without departing from the scope thereof, and I intend to include all such variations as fall within the scope of the appended claims in this application, in which only the preferred forms of my invention have been disclosed.

By the terms control, adjacent, subsidiary, carried, and/or associated bearings, as utilized in the accompanying claims is included the pivotal control bearings such as the upper and lower king pin bearing, and also the thrust bearing, which are located internally of the knuckle; the steering actuating controlling bearings such as the drag link and tie rod bearings which are located externally of the knuckle; and other bearings associated with, positioned about, or located adjacent to the knuckle which are adapted to receive lubricant from the same source that supplies said knuckle bearings proper.

It is to be understood that although the invention of the present application is illustratively described in connection with a steering knuckle of an automotive vehicle, it is broadly adaptable to the supply of lubricant to a plurality of bearings particularly at different levels, and particularly by gravity systems. Even though the invention is particularly adapted to the supply of lubricant to a plurality of bearings from a central chassis lubricating system, it is also adapted to the supply of lubricant by individual application to the several bearings of an automobile chassis.

I claim:

1. A steering knuckle having an arm projecting therefrom, a bearing on said arm and below the upper end of the knuckle, a conduit carried by the knuckle and extending to said bearing, inlet means including a covered collecting chamber at the upper end of said conduit and said knuckle delivering lubricant to said conduit and a vent to said collecting chamber to permit free flow of lubricant through said conduit to the bearing.

2. In a motor vehicle, an axle, a knuckle having an arm rigid therewith carrying a bearing, a lubricant inlet fast to said axle, a swivel connection between said knuckle and said axle, a conduit carried by said knuckle and in fluid intercepting relationship with lubricant from said inlet at the top of the knuckle and extending in part generally along said arm to said bearing and a substantially dust-tight vent maintaining the upper part of said conduit along said arm under atmospheric pressure, said conduit being of diameter too small to permit passage of lubricant about any air therein.

3. A steering knuckle comprising bearings at different levels, a lubricant inlet, a conduit system leading to the bearings, means for dividing the lubricant substantially above said bearings and a vent near the dividing means to maintain atmospheric pressure on the conduit system.

4. In a lubricating installation, in combination, bearings at different levels, a common source of lubricant at level higher than said bearings, conduit means connecting said common source with said bearings affording a siphoning passage from a higher to a lower bearing and means near said common source maintaining atmospheric pressure in said passage and thereby precluding siphoning.

5. In a lubricating installation, in combination, bearings at different levels, a common source of lubricant at level higher than said bearings, conduit means including a dividing arrangement connecting said common source with said bearings affording a siphoning passage from a higher bearing to a lower bearing and a vent to said conduit means above the level at which the lubricant divides in its course to the bearings, said vent establishing atmospheric pressure in the conduit means to prevent siphoning from said higher to said lower bearing.

6. In a lubricating installation, bearings at different levels, a common source of lubricant at level higher than said bearings, conduit means connecting said common source with said bearings affording a siphoning passage from a higher bearing to a lower bearing and a covered venting arrangement near said common source establishing atmospheric pressure therein and thereby precluding siphoning, said arrangement being provided with a cover to exclude dust and dirt.

7. In a lubricating installation, in combination, bearings at different levels, a common lubricant source, a conduit system including a dividing arrangement connecting said common source with said bearings affording a siphoning passage from a higher to a lower bearing and a vent to said conduit above the level at which the lubricant divides in its course to the bearings consisting of a downwardly extending passage to prevent clogging with mud or dirt.

8. A lubricating installation comprising a fixed bearing structure, a knuckle pivoted thereon provided with a pair of control bearings at different levels, a common lubricant supply chamber at a level higher than said bearings, conduits connecting said chamber to said bearings, an inlet structure rigid with the bearing structure for supplying said chamber and forming a cover therefor, means for preventing the entry of dust between said inlet structure and said chamber while permitting relative movement therebetween as the knuckle is pivoted and a vent to said chamber.

9. In a steering knuckle, in combination, an axle, a knuckle having a pivotal mount with respect to said axle, a lubricant inlet opening, a tie rod bearing and a drag link bearing, one of said bearings being at a higher level than the other, a lubricant inlet fixed with respect to said axle and delivering to said knuckle inlet opening, gasket means interposed between said fixed inlet and said knuckle, a conduit carried by the knuckle from said inlet opening leading to the tie rod bearing, a second conduit from said opening carried by the knuckle and leading to the drag link bearing and a vent at said opening.

10. In a steering knuckle construction, in combination, an axle, a king pin therethrough, a knuckle carrying tie rod and drag link bearings, a lubricant inlet rigid with the axle, an annular well near the upper end of the knuckle intercepting lubricant from said inlet, means precluding the entry of dust into said well while permitting the free steering movement of the knuckle, a pair of conduits supplied from said well, one leading to the tie rod and the other to the drag link bearing and an atmospheric vent through the knuckle communicating with the well.

11. In a motor vehicle, an axle beam, a king pin, a steering knuckle having a pivotal mount with respect to said king pin, a tie rod bearing on said knuckle, a thrust bearing sustaining the axle beam upon a part of the knuckle and means supplying lubricant in series to said thrust bearing and said tie rod bearing, said means comprising a passage leading into said thrust bearing and a draining passage from said thrust bearing leading to said tie rod bearing.

12. In a motor vehicle, in combination, an axle beam, a king pin fixed thereto, a knuckle having a pivotal mount thereon, a tie rod bearing on said knuckle, a thrust bearing near the lower part of said knuckle and sustaining said axle beam, a longitudinal bore through said king pin conveying lubricant downward therethrough, a lubricant passage in communication with said bore and leading to said thrust bearing and a drain passage below said thrust bearing leading lubricant in series therefrom to the tie rod bearing.

13. In a motor vehicle, an axle beam, a king pin, a steering knuckle having a pivotal mount with respect to said king pin, a tie rod bearing on said knuckle, a thrust bearing sustaining the axle beam upon a part of the knuckle and means supplying lubricant to said thrust bearing and said tie rod bearing comprising a passage leading into said thrust bearing, a star washer interposed between said thrust bearing and said knuckle, an annular groove in said knuckle intercepting lubricant from said thrust bearing that has passed thereto between the teeth of the star washer and a draining passage from said groove leading to said tie rod bearing.

14. In a motor vehicle, in combination, an axle, a knuckle having a clevis straddling said axle and carrying a bearing, a king pin fixed in said axle and bearing in the jaws of said knuckle clevis, a lubricant conduit carried by the knuckle and extending downward from the upper clevis jaw to the bearing on said knuckle, a structure fixed to said axle admitting lubricant to said conduit at the upper part of the knuckle, a gasket between the upper clevis jaw and the admitting structure positioned so as to make the connection between the admitting structure and the inlet of the lubricant conduit dust and airtight and an atmospheric vent passage communicating with the inlet of said conduit and opening to the atmosphere at the lower face of the upper clevis jaw.

15. The combination of an axle, a knuckle having a pivoting mount with respect thereto, a thrust bearing carried thereby and sustaining said axle, a tie rod bearing and a drag link bearing carried by said knuckle and means for lubricating all of said bearings from a single source, said means including a conduit system supplied from said source and delivering to said drag link bearing and in parallel therewith to the remaining bearings, the tie rod bearing being supplied with lubricant that has passed through said thrust bearing.

16. In a lubricating installation, in combination, a fixed structure, a structure swiveled thereto and carrying one or more bearings, means supplying lubricant from a remote source on said fixed structure to the bearings on said swiveled structure including a pipe line leading to said swiveled structure and having a terminal adjacent thereto on said fixed structure, a valve associated with said terminal and normally maintaining the pipe line closed but adapted to be opened under pressure transmitted through the pipe line, means on said swiveled structure intercepting lubricant passed through said valve at a point above the level of said bearings, a conduit system feeding said lubricant downwardly along said structure to the bearings thereof from said intercepting means and a vent to the upper end of said conduit system.

17. In a motor vehicle, in combination, an axle, a knuckle pivoted thereto carrying one or more bearings, a pipe line on said axle having a terminal adjacent the upper end of the pivot mount of said knuckle, valve means normally closed to prevent the passage of fluid from said pipe line past said terminal and adapted to open under pressure transmitted through said pipe line, intercepting means on the knuckle to receive lubricant transmitted past the valve, a dust and airtight closure between said axle and said knuckle protecting said intercepting means, a piping system on said knuckle draining the lubricant intercepted by said knuckle downward to the bearings thereof and a venting port through a part of said knuckle to the interior of the closure.

18. In a motor vehicle, in combination, an axle, a knuckle carrying a bearing, a thrust bearing sustaining the former on the latter above said knuckle bearing, a pivotal mount for said knuckle on said axle having upper and lower bearings on either side of said thrust bearing, means admitting lubricant to the bearing surface of said thrust bearing, a conduit connecting said thrust bearing with said knuckle bearing to drain lubricant from the former to the latter and enclosing means for said thrust bearing having an outlet port delivering into said conduit.

19. In a motor vehicle, an axle beam, a steering knuckle having pivotal mount with respect thereto with upper and lower bearings, a thrust bearing between said upper and lower pivotal bearings maintaining the axle beam upon a part of the knuckle and including a pair of races having circular antifriction members interposed therebetween, means supplying lubricant to said thrust bearing, a control bearing carried by said knuckle at a level lower than said thrust bearing, a passageway supplying lubricant to said control bearing and an enclosure for said thrust bearing affording a gap through which lubricant drains to said passageway.

20. In a lubricated anti-friction bearing construction, a pair of races, rolling anti-friction members positioned between said races, a retainer adapted to hold said races together, an enclosure for said construction consisting of telescoping cup-shaped base and cap members, said enclosure being spaced from the sides and the bottom of said retainer and being provided with openings in its base to permit of drainage of excess lubricant supplied thereto.

21. In a motor vehicle, an axle beam, a steering knuckle having a pivotal mount with respect thereto and carrying drag link and tie rod bearings, a lubricant inlet rigid with the axle beam and collecting means adjacent the top and the bottom of the pivotal mount to receive lubricant from the inlet and to dispense it respectively to the drag link and the tie rod.

22. In combination with a structure including an axle eye, a king pin fixed in said axle eye and protruding on both sides thereof and a clevised steering knuckle the jaws of which encircle and bear upon said king pin and carrying control bearings; a lubricating installation comprising a lubricant source adjacent the top of the king pin, a collecting chamber supplied from said lubricant source also adjacent the top of the king pin, a collecting groove also supplied from said source adjacent the lower end of said king pin and a conduit system for conveying lubricant from the collecting chamber to one of said control bearings and from said collecting groove to the other of said control bearings.

23. In a lubricant installation for the bearings of a steering knuckle, in combination, an axle, a steering knuckle having a pivotal mount upon said axle and carrying two control bearings, distributing means adjacent the upper portion of said pivotal mount, means to supply lubricant to said distribution chamber and two conduit systems leading from said distributing means, one conduit system being adapted to supply a pivotal bearing and one of the control bearings and the other conduit system being adapted to supply the other control bearing.

24. In combination with a structure including an axle, a steering knuckle having a pivotal mount upon said axle, a king pin rigid with one of said elements and bearing elements encircling the upper and lower ends of the king pin rigid with the other of said elements, a lubricating installation comprising a lubricant source adjacent the top of the king pin and supplying the upper king pin bearing with lubricant and means for conducting lubricant which has passed through the upper king pin bearing to the lower king pin bearing including an axial bore.

25. In combination with a structure comprising an axle eye, a king pin fixed in said axle eye and protruding on both sides thereof and a clevised steering knuckle, the jaws of which embrace the protruding ends of the king pin and a thrust bearing between the lower clevis jaw and the axle eye; a lubricating installation comprising a lubricant source adjacent the upper end of the king pin and supplying the upper king pin bearing and bores in said king pin adapted to drain lubricant from the upper king pin bearing to the lower king pin bearing and through the bearing, said bores consisting of an axial bore through said king pin and radial inlet and outlet bores adjacent the upper and lower ends of said axial bore, respectively.

26. In combination, a vertical pin having bearings near its upper and its lower ends, a common source of lubricant above said pin to supply said bearings by gravity flow and delivering directly to said upper bearing, a radial bore in said pin draining said upper bearing, a longitudinal bore through said pin communicating with said lower bearing and a venting aperture in said pin above the level of lubricant in said distributor, the longitudinal bore being of diameter sufficiently large to permit passage of lubricant about any air therein.

27. In a lubricating installation for a mechanism with a plurality of bearings at different levels, including a source above the upper bearing, a conduit from adjacent said upper bearing to a lower bearing, said upper bearing including an encircling element, a bushing rigid therewith and a central element, said bushing being provided with a plurality of grooves on its outside surface, which grooves pass lubricant from the source to said lower bearing around said upper bearing.

28. In combination with a bearing having a vertical cylindrical encircling element, a bushing rigid therewith and a central shaft; a lubricating installation comprising a lubricant inlet above said bearing, spaced longitudinal grooves on the outside of said bushing, a peripheral groove on the outside of said bushing substantially below the upper end of the bearing and in communication with said longitudinal groove and a bore through said encircling element communicating with said peripheral groove.

29. In a motor vehicle of the type having an axle and a knuckle, one of which is provided with an eye and the other of which is provided with a clevis embracing said eye, a king pin fixed in the eye element and having upper and lower bearings in the clevis; a lubricating installation comprising a lubricant inlet above the upper bearing, a chamber to receive lubricant from said inlet above the upper bearing, a king pin bore for feeding the lower bearing, said bore being in communication with said chamber through said upper king pin bearing and means to vent the upper portions of said chamber and said bore.

30. In a steering knuckle construction, in combination an axle, a king pin therethrough, a knuckle carrying tie rod and drag link bearings, a lubricant inlet rigid with the axle, an annular well near the upper end of the knuckle intercepting lubricant from said inlet, means precluding the entry of dust into said well while permitting the free steering movement of the knuckle, a pair of conduits supplied from said well, one leading to the tie rod and the other to the drag link bearing and an atmospheric vent through the knuckle communicating with the well, said vent extending downwardly through the knuckle and its atmospheric end being covered by a part of the construction.

31. In a motor vehicle, an axle beam, a king pin, a steering knuckle having a pivotal mount with respect to said king pin, a tie rod bearing on said knuckle, a thrust bearing sustaining the axle beam upon a part of the knuckle and means supplying lubricant in series to said thrust bearing and said tie rod bearing, said means comprising a passage leading into said thrust bearing and a draining passage from said thrust bearing leading to said tie rod bearing, said thrust bearing being provided with a casing and said casing being provided with an inside inlet and with an outlet at its bottom.

Signed at New York, in the county of New York and State of New York this 20th day of September, A. D. 1930.

JOSEPH BIJUR.